April 16, 1940.    D. G. FORTT    2,197,687
TIME CONTROL DEVICE
Filed June 7, 1939    2 Sheets-Sheet 1

INVENTOR.
DARIO GONZALES FORTT.
BY
ATTORNEYS.

April 16, 1940.  D. G. FORTT  2,197,687
TIME CONTROL DEVICE
Filed June 7, 1938   2 Sheets-Sheet 2
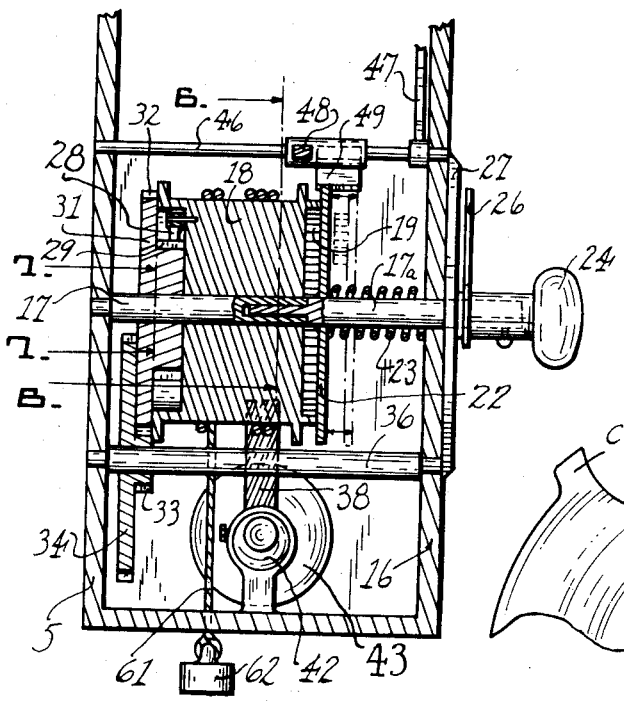
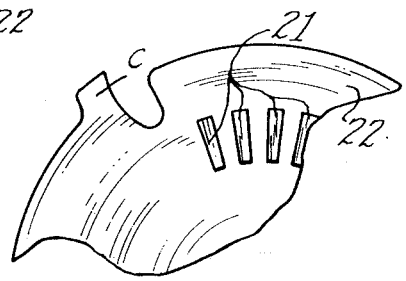
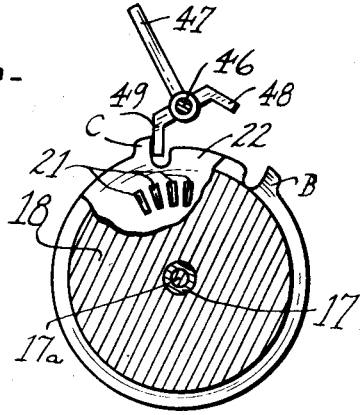
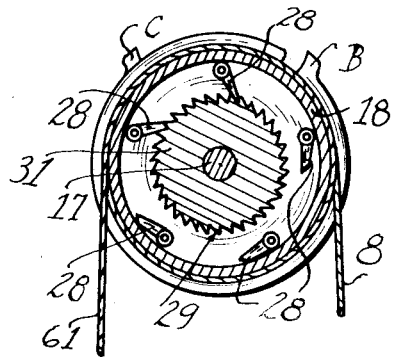
INVENTOR.
DARIO GONZALES FORTT.
BY Victor J Evans Co
ATTORNEYS Patented Apr. 16, 1940

2,197,687

UNITED STATES PATENT OFFICE 2,197,687

TIME CONTROL DEVICE

Dario Gonzalez Fortt, Los Angeles, Calif.

Application June 7, 1938, Serial No. 212,367

5 Claims. (Cl. 161—1)

This invention relates to improvements in devices for timing and controlling light in connection with photographic printing.

The principal object of this invention is to provide means whereby the time element may be varied in accordance with conditions.

A further object is to produce a device of this character which may be combined with an ordinary printing box commonly used by photographers.

A further object is to produce a device of this character which is simple in construction, economical to manufacture, and easy to install.

A further object of the invention is to provide means whereby the device will be reset at the end of each operation.

Other objects and advantages will be apparent during the course of the following description.

In the accompanying drawings forming a part of this specification and in which like numerals are employed to designate like parts throughout the same, Fig. 1 is a side elevation of my device with the cover removed;

Fig. 4 is a cross sectional view taken on the line 4—4 of Fig. 1;

Fig. 5 is an enlarged fragmentary detailed view of the timer disc;

Fig. 6 is a detailed view showing the manner in which the timer disc actuates the switch trip; and Fig. 7 is a detailed view of the ratchet connection between the drum and the driven gears.

Figure 1:
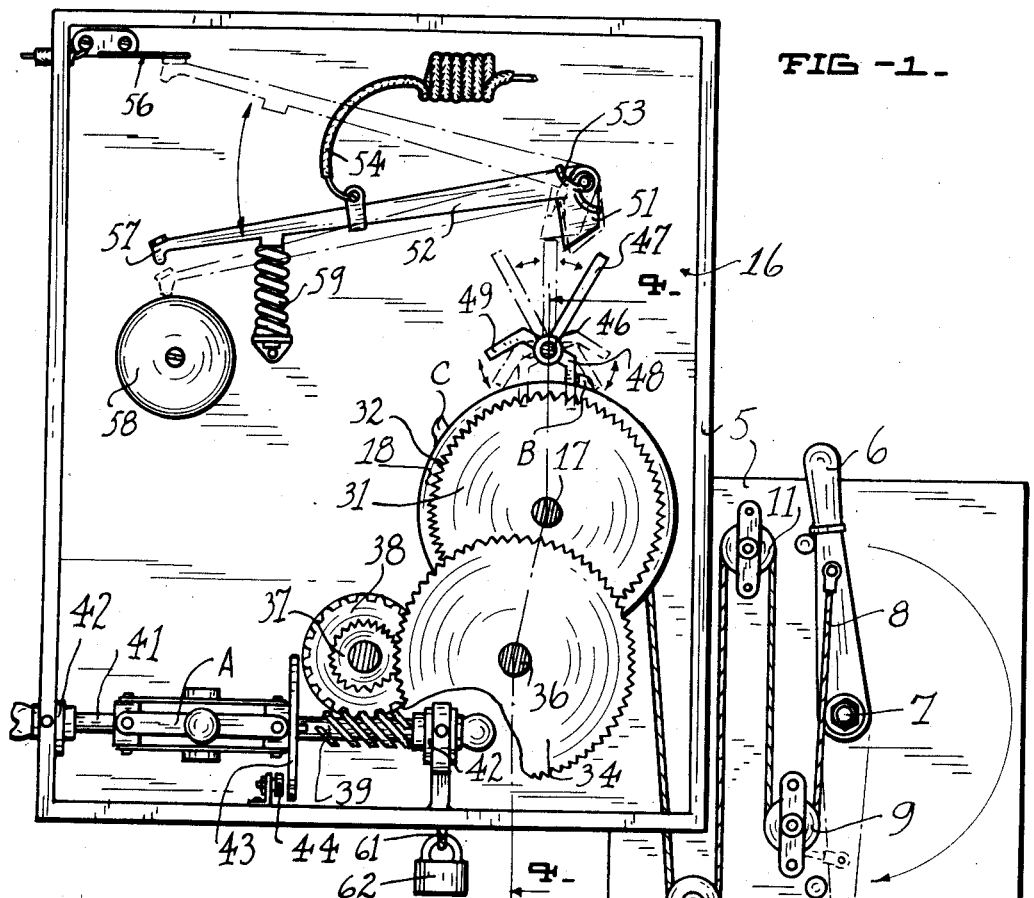

In producing photographic prints it is necessary to subject sensitized paper to light rays passing through the negative. This applies whether making contact prints or enlargements. After the correct exposure has been determined for a negative, it is important that future prints made from that negative be timed similarly; and I have, therefore, produced a device which will turn on a light automatically, maintain this light for a predetermined time, and then extinguish the light at the end of the predetermined time; and further, a device which will reset itself ready for the next operation.

In the accompanying drawings wherein for the purpose of illustration is shown a preferred embodiment of my invention, the numeral 5 designates a box containing my device. To the side of the box I attach a lever 6 which is pivoted as at 7 and has a cable 8 attached thereto and reeved over a pulley 9, thence over a pulley 11, thence over a pulley 12 to which a weight 13 is secured, which weight at certain times rests upon a shelf 14. Secured adjacent the box 5 is a timer box 16 in which the timer mechanism is mounted. This mechanism consists of a shaft 17 having a drum 18 rotatably mounted thereon, which drum carries teeth 19 upon one face thereof, which teeth are adapted to be engaged by teeth 21 formed upon the timer disc 22, which timer disc is secured to the front end 17a of the shaft 17. A spring 23 tends to hold this timer disc toward the drum 18. A knob 24 is secured to the shaft 17a and carries a pointer 26 which moves over a dial 27. The drum 18 has a plurality of gravity latches 28 which engage teeth 29 carried upon a gear 31 freely rotatable on the shaft 17, and having its teeth 32 meshing with teeth 33 of the gear 34 secured to the shaft 36. The teeth of the gear 34 drive a gear 37 which in turn drives a worm gear 38 engaging a worm 39 mounted upon the governor shaft 41 which is mounted in eccentric bearings 42. As the operation of a ball governor, such as shown as a whole at A, is well-known, further discussion thereon is unnecessary. A brake disc 43 actuates the brake shoe 44 to control the governor action.

Positioned above the drum 18 is a cross shaft 46 upon which is pivoted a switch trip having an arm 47 and legs 48 and 49. The arm 47 is capable of engaging a pivoted trip 51 carried on the pivoted end of the switch lever 52. This trip 51 is normally held in position by a spring 53, the purpose of which will be later seen. This lever 52 is connected to one side of an electric circuit as shown at 54 and contacts a plate 56 connected to the opposite side of the circuit. A hammer is formed at 57 and is capable of engaging a gong 58. A spring 59 is mounted in the path of movement of the lever so that after the hammer strikes the gong, it will be raised away therefrom.

The cable 8 is wrapped around the drum 18 and has its free end secured thereto. A similar cable 61 is wrapped around the drum 18 in an opposite direction and has secured thereto a weight 62 of less weight than the weight 13.

As a result of this construction, when a photographer wishes to make a print, the negative and printed paper are positioned in the printing box (not shown in the drawings) in the usual manner.

Figure 2:
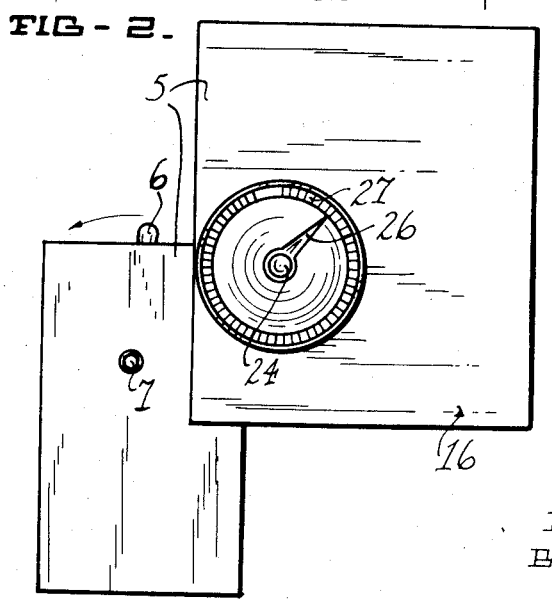
Fig. 2 is a similar view from the opposite side and on a reduced scale.
Figure 3:
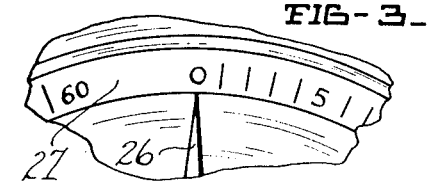
Fig. 3 is a fragmentary detailed view showing the indicator scale and pointer.

In many instances it may be desirable to eliminate the weight resetting mechanism shown in Figs. 1 and 2, and in this event, the end of the cable 8 would be attached to an arm or lug mounted to the cover of the before-mentioned printing box. The closing of the cover of the printing box would then actuate the weight 13 in a similar manner as the mechanism shown in the drawings. The opening of the cover would, likewise, permit the secondary weight 62 to perform its usual function.

Assuming that the correct printing time is known, the operator grasps the knob 24, pulls the same toward the front of the box 16 so as to disengage the teeth 21 from the teeth 19 of the drum, and then rotates the knob until the pointer rests upon the dial 27 at a point to indicate the proper time. The knob is now released which causes the teeth of the timer disc to engage the teeth on the drum. During this operation, it will be noted that the projection C on the timer disc has been moved away from the projection B upon the drum, or in other words, by this arrangement of having the timer disc movable, the spacing between the projections B and C may be varied as desired. The operator now pulls the lever 6 from the dotted line position of Fig. 1 to the full line position of this figure, with the result that the cable 8 will be shortened a sufficient amount to lift the weight 13 off the shelf 14. As the cable 8 has its free end connected to the drum 18, this weight will tend to rotate the drum, which drum is now connected through the gravity latches 28 to the gear 31 and through the associated gears. The governor A will then be rotated and will continue to rotate until the weight 13 has again reached the shelf 14. As soon as this occurs, the drum 18 will cease to rotate, and the weight 62 now comes into play so as to rotate the drum in the opposite direction, or in other words, return it to starting position, which is accomplished through the fact that the latches 28 only operate in one direction.

The switch mechanism for turning the light on or off operates as follows:

When the lever 6 is first thrown, the projection B will be against the leg 48 with the lower end of the leg extending into the cutaway portion in the periphery of the drum 18. We will assume now that the weight 13 commences to rotate the drum 18, turning the drum and the timer disc 22 in a clockwise direction as viewed from Fig. 1. As soon as the leg 48 moves out of the cutaway portion adjacent the projection B, the leg 48 will ride upon the periphery of the drum, thus forcing the arm 47 beneath the trip 51, raising the lever 52 to the dotted line position and completing the electric circuit. Continued movement of the drum tends to wind the cable 61 upon the drum and raise the weight 62. As soon as the projection C engages the leg 49, it will move the same into the position of Fig. 6, thus moving the arm 47 from beneath the trip 51, and immediately the lever 52 will drop breaking the electric circuit and ringing the gong 58.

As soon as the lever 6 is moved to the dotted line position of Fig. 1, the cable 8 will become slack, and immediately the weight 62 will tend to rotate the drum in a reverse direction, thus returning the parts to the starting position. When this occurs, the leg 49 will ride upon the periphery of the timer disc 22, moving the arm 47 to a vertical position against the trip 51, which will move against its spring 53. As soon as the projection B comes into contact with the leg 48, it will be tipped to the full line position of Fig. 1, thus forcing the arm 47 past the trip 51 and placing all parts in position to again be used.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, a shaft, means for manually rotating said shaft, a disc carried by the said shaft, a drum freely rotatable on the said shaft, means for connecting said disc and said drum, whereby said disc and said drum may be rotated independently of each other a predetermined distance, means for rotating said drum, a switch mechanism actuated by said drum and said disc to alternately complete and break an electric circuit, means for controlling the rate of rotation of said drum, a cable secured to said drum, a weight means, carried by the said cable to effect the rotation of the drum in one direction, a second cable secured to said drum in a manner to be wound therearound when the same is rotated by the said first-mentioned weight, a weight secured to the second-mentioned cable of less weight than said first-mentioned weight to cause rotation of said drum in a reverse direction, and means for lifting said first-mentioned weight to create a pull on said drum to effect rotation in one direction.

2. In a device of the character described, a shaft, means for manually rotating said shaft, a disc carried by the said shaft, a drum freely rotatable on the said shaft, means for connecting said disc and said drum whereby said disc and said drum may be rotated independently of each other a predetermined distance, a switch mechanism actuated by said drum and said disc to alternately complete and break an electric circuit, means for controlling the rate of rotation of said drum, a cable secured to said drum, a weight means carried by the said cable to effect the rotation of the drum in one direction, a second cable secured to said drum in a manner to be wound therearound when the same is rotated by the said first-mentioned weight, and a weight secured to the second-mentioned cable of less weight than said first-mentioned weight to cause rotation of said drum in a reverse direction.

3. A control for printing apparatus comprising a housing, a drum having teeth elements and a peripheral projection rotatably mounted within said housing, a gear engageable with the teeth elements of the said drum and formed with a peripheral projection, spring means cooperative with the gear to urge the same into engagement with the teeth of the drum, a pivoted trip member including bifurcations engageable by the projections of the said drum and gear, a pivoted switch arm actuated by the said trip member, an electric circuit normally broken by the said switch arm, and a manual control to effect the rotation of the drum to move the trip member into engagement with the pivoted switch arm and to close the said electric circuit.

4. A control for printing apparatus comprising a housing, a drum having teeth elements and a peripheral projection rotatably mounted within said housing, a gear engageable with the teeth elements of the said drum and formed with a peripheral projection, spring means cooperative with the gear to urge the same into engagement with the teeth of the drum, a pivoted trip member including bifurcations engageable by the projections of the said drum and gear, a pivoted switch arm actuated by the said trip member, an electric circuit normally broken by the said switch arm, means to manually disengage the gear from the drum and to rotate the gear relative to the drum to separate their respective projections a selected distance, and a weight means acting on the drum to rotate the same to actuate the trip member into engagement with the said switch arm and to hold the same in engagement therewith until the projection on the said gear engages the trip element to move the same out of engagement with the switch arm.

5. A control for printing apparatus comprising a housing, a drum having teeth elements and a peripheral projection rotatably mounted within said housing, a gear engageable with the teeth elements of the said drum and formed with a peripheral projection, spring means cooperative with the gear to urge the same into engagement with the teeth of the drum, a pivoted trip member including bifurcations engageable by the projections of the said drum and gear, a pivoted switch arm actuated by the said trip member, an electric circuit normally broken by the said switch arm, means to manually disengage the gear from the drum and to rotate the gear relative to the drum to separate their respective projections a selected distance, a weight means acting on the drum to rotate the same to actuate the trip member into engagement with the said switch arm and to hold the same in engagement therewith until the projection on the said gear engages the trip element to move the same out of engagement with the switch arm, and means to reversely rotate the drum into the initial position after each actuation thereof by the said weight means.

DARIO GONZALEZ FORTT.